US005211966A

United States Patent [19]

Raudies et al.

[11] Patent Number: 5,211,966

[45] Date of Patent: May 18, 1993

[54] DEVICE FOR DETACHABLY FASTENING A BOX

[75] Inventors: Gerhard Raudies, Egliswil, Switzerland; Walter Steinmann, Kadelburg, Fed. Rep. of Germany

[73] Assignee: Bucher-Guyer AG Machinenfabrik, Niederweningen, Switzerland

[21] Appl. No.: 490,555

[22] PCT Filed: Sep. 12, 1989

[86] PCT No.: PCT/CH89/00168

§ 371 Date: May 10, 1990

§ 102(e) Date: May 10, 1990

[87] PCT Pub. No.: WO90/02651

PCT Pub. Date: Mar. 22, 1990

[30] Foreign Application Priority Data

Sep. 14, 1988 [CH] Switzerland ........................ 3419/88

[51] Int. Cl.[5] ............................................ B29C 43/04

[52] U.S. Cl. ................................ 425/193; 100/918; 425/195; 425/218; 425/450.1; 425/451; 425/451.7; 425/451.9

[58] Field of Search ..................... 425/193, 195, 450.1, 425/451, 190, 451.7, 451.9, 218; 100/918

[56] References Cited

U.S. PATENT DOCUMENTS

| | | | |
|---|---|---|---|
| 2,382,458 | 8/1945 | Williams et al. | 425/218 |
| 3,427,854 | 2/1969 | Michelson | 100/918 |
| 3,792,947 | 2/1974 | Diehl | 425/193 |
| 3,841,141 | 10/1974 | Rachwal | 100/918 |
| 3,862,565 | 1/1975 | Smit | 72/448 |
| 3,889,515 | 6/1975 | Grombka | 72/448 |
| 4,077,757 | 3/1978 | DeCoster | 425/218 |
| 4,341,510 | 7/1982 | Croseck et al. | 425/193 |
| 4,500,275 | 2/1985 | Ruhl | 425/195 |
| 4,793,785 | 12/1988 | Osada | 425/190 |
| 4,861,254 | 8/1989 | Takeuchi et al. | 425/190 |

FOREIGN PATENT DOCUMENTS

| | | | |
|---|---|---|---|
| 939551 | 10/1963 | United Kingdom | 100/918 |

*Primary Examiner*—Willard Hoag
*Attorney, Agent, or Firm*—Edmund M. Jaskiewicz

[57] ABSTRACT

A press having a U-shaped mold table and a removable mold block insertable therein. The mold block is wedged upward against limiting guide members of the mold table.

8 Claims, 6 Drawing Sheets

DEVICE FOR DETACHABLY FASTENING A BOX

FIELD OF THE INVENTION

This invention relates to an insertable molding box to a mold table of a press, and the mold table and the insertable box are provided with laterally opposite guide arrangements, and lifting means are provided that hold the box against the downward-oriented adjusting surfaces on the mold table in the operating position.

DESCRIPTION OF THE PRIOR ART

A known device of the type mentioned according to DE-A-33 14 272 (laid open Dec. 15, 1983) exhibits, between the mold box and the legs of the U-shaped mold table, a guide element each provided with guide grooves on which the box lies by a lateral guide strip and which, in the operating position, holds the box against the upper adjusting surfaces of the guide grooves by the key inserted under it so that a mainly plane surface formed from several parts is produced laterally over the mold surface.

Because of several components and/or additional guide elements, this design causes considerable high construction and manufacturing costs. The wear occurring with the known design can be corrected only at great expense.

SUMMARY OF THE INVENTION

Thus the object of the invention is to provide a device of the type mentioned above that is distinguished by simplicity and that makes possible great latitude in size or a high degree of general-purpose application.

According to the invention, this object is achieved in that the surface of the box allocated to the mold feed opening and the adjusting surfaces provided on the mold table form a common plane.

This design principle makes possible, relative to the previous embodiments, a simplified way of arranging the mold table and box within a press and guarantees the use of various lifting and clamping means, for example hydraulic, pneumatic or mechanical hoists, keys, spindle drives, etc. to anchor the box in the mold table.

Especially on a block press for the production of molded parts of a free-flowing material (ceramic molding compound) that is fed by a mold filling slide bar to the mold cavity provided in the box, the construction principle according to the invention proves advantageous because the box-bordering contact surface of the filling slide bar can merge flush with the common plane formed by the mold table and box. The configuration and arrangement of these bulk parts can thus be considerably simplified and refinishing work due to mold wear can be reduced.

A special embodiment according to the basic design system on a press with a U-shaped mold table on whose inner sides of the legs there are provided opposite guide grooves that form a guide arrangement with the insertable box (mold block) and that receive the box by mold carriers on support surfaces, guide grooves that exhibit, between their one adjusting surface and the mold carrier, in each case a key that can be driven in to anchor the box, is distinguished in that the guide grooves are placed in the legs of the mold table and in that the surface of the box allocated to the mold feed opening and the other adjusting surfaces of the guide grooves form the common plane in the operating position of the box.

This yields considerable advantages in the manufacturing and application engineering of these unavoidable bulk parts, as well as advantages of an economic nature. Among other things, it becomes possible to take into consideration the guide grooves provided in the legs of the U-shaped mold table by recesses in the mold. Machining is considerably simplified and more cost-effective. The box is simplified without reducing its strength and the insertion is performed without any special problems; in this way, obstacles on the mold table can be reduced. The universality can be further improved by simplifying the box and the formerly used boxes can be used again on the uniform fastening mold with limited adaptations. The refinishing work on the adjusting surfaces is eliminated.

The abrasion phenomena that appear by the use of the box, mainly on its surface, because of the movement of the filling slide bar and that occasionally require a resurfacing by grinding, in no way negatively affect the construction conditions or precision and adaptation of the box to the original mounting conditions because of the reduction in the box height. The top side of a box subsequently machined in its height always assumes again the same position in the operating condition.

It then proves to be especially suitable if the support surfaces of the box form a shoulder with its surface, a shoulder which, when fastened, is clamped in each case between an adjusting surface of a guide groove and a mold carrier.

To avoid wear marks or abrasion phenomena on the mold table, the one adjusting surface of the guide grooves that forms the keyway in each case is made with a strip for whose attachment a steplike recess is provided in the mold table along the guide grooves and which is fastened to the mold table by screws.

For the same purpose, a plate is replaceably fastened on the contact surface, facing the shoulder of the box, of the mold carrier.

BRIEF DESCRIPTION OF THE DRAWINGS

Further explanations of the invention can be drawn from the following description and the drawing. There are shown in.

DESCRIPTION OF THE PREFERRED EMBODIMENTS

Figure 1:
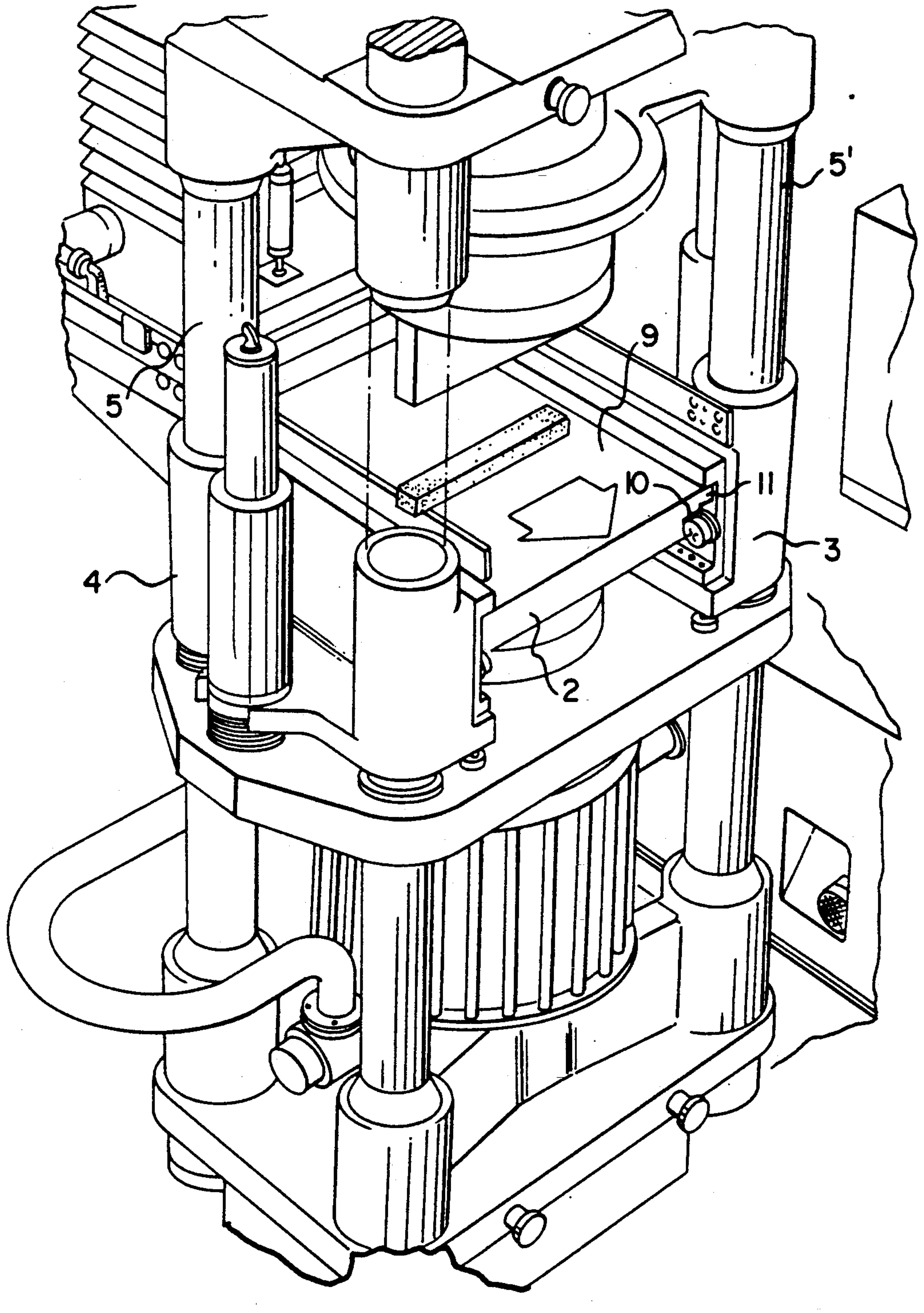
FIG. 1 is an overall perspective view of a portion of a press showing a mold block carried within a mold table according to the present invention.

The proposed design principle offers to one skilled in the art and to the user a rich selection of alternative possibilities in using a device for detachably fastening a box (mold block) 2 to a mold table 3 of a press not represented in more detail in the drawing.

Figure 2:
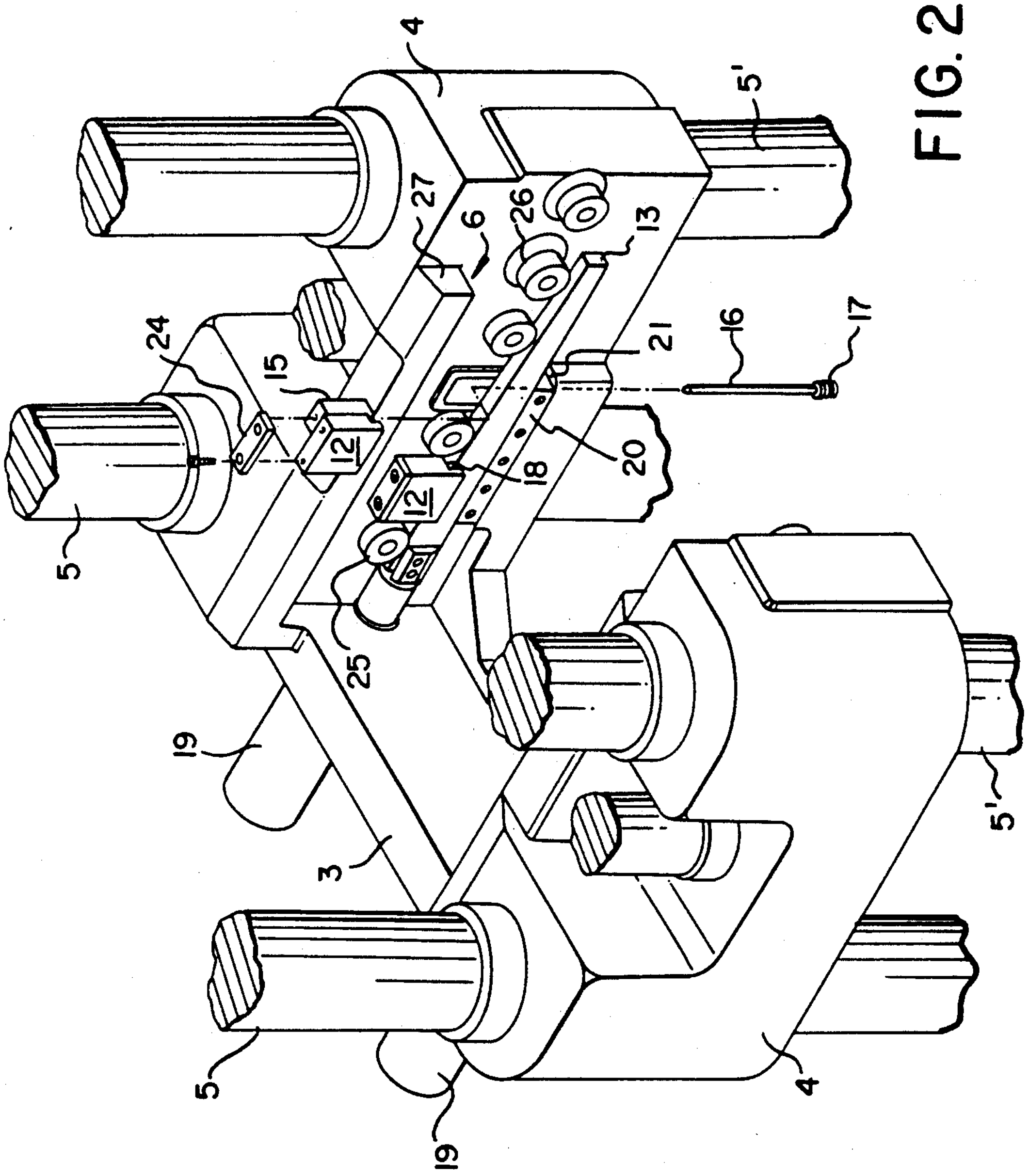
FIG. 2 is a detailed view also in perspective of the U-shaped mold table shown in FIG. 1 but with the mold block removed to illustrate the fastening device according to the present invention.
Figure 3:
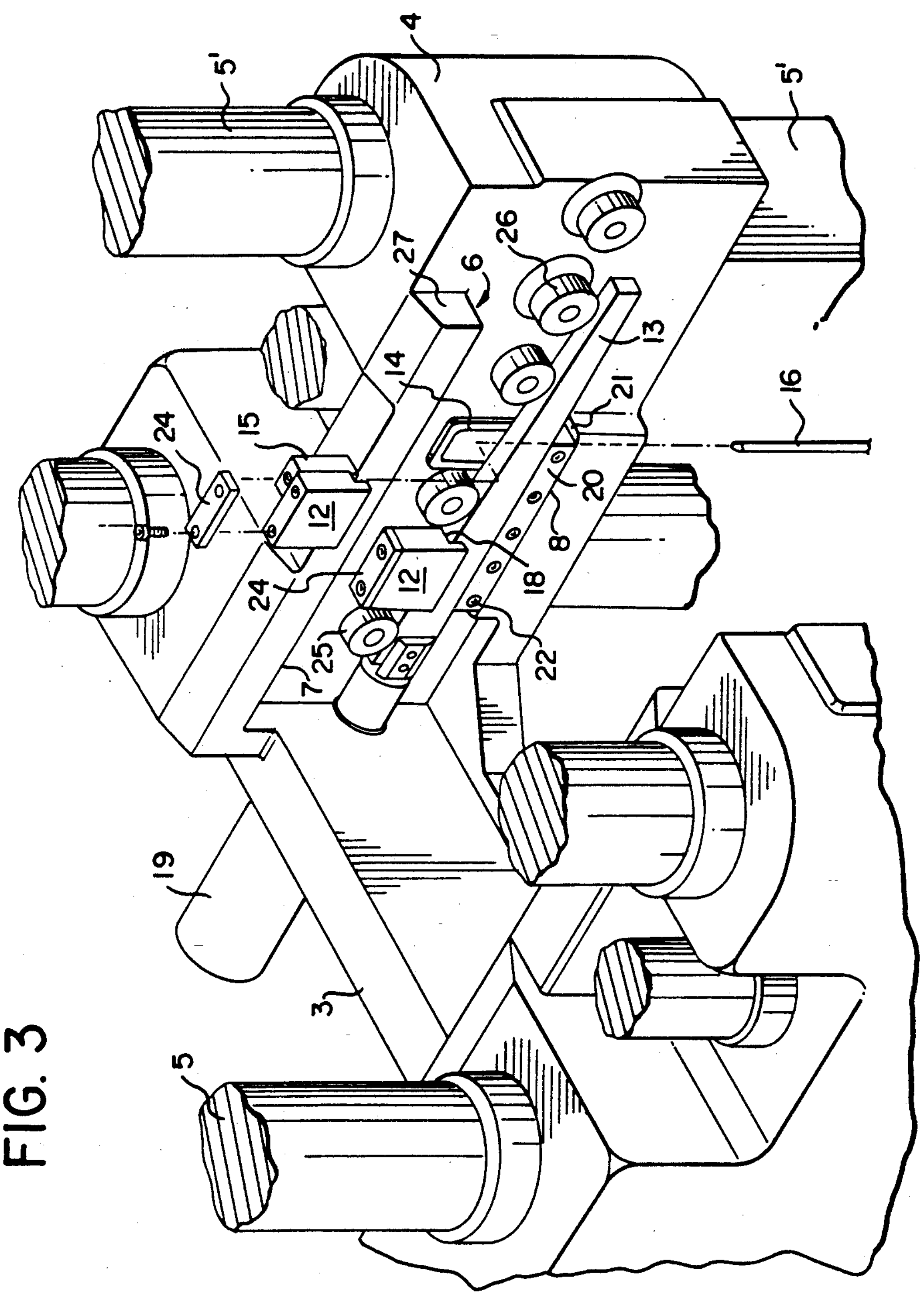
FIG. 3 is a perspective view in enlarged scale of FIG. 2 illustrating a detailed view of the fastening device.
Figure 4:
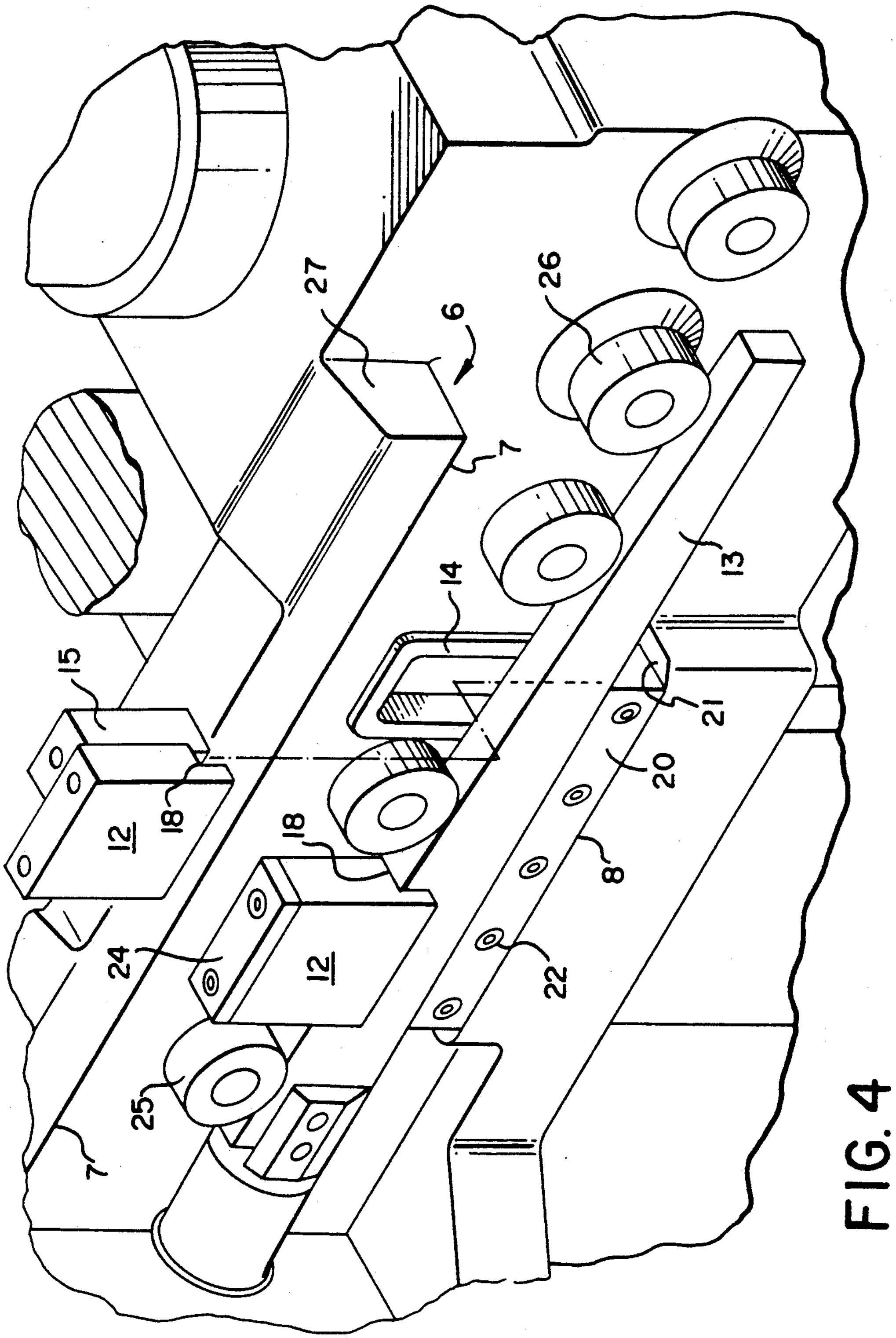
FIG. 4 is a perspective view in further enlarged scale showing the fastening device of FIG. 3.
Figure 5:
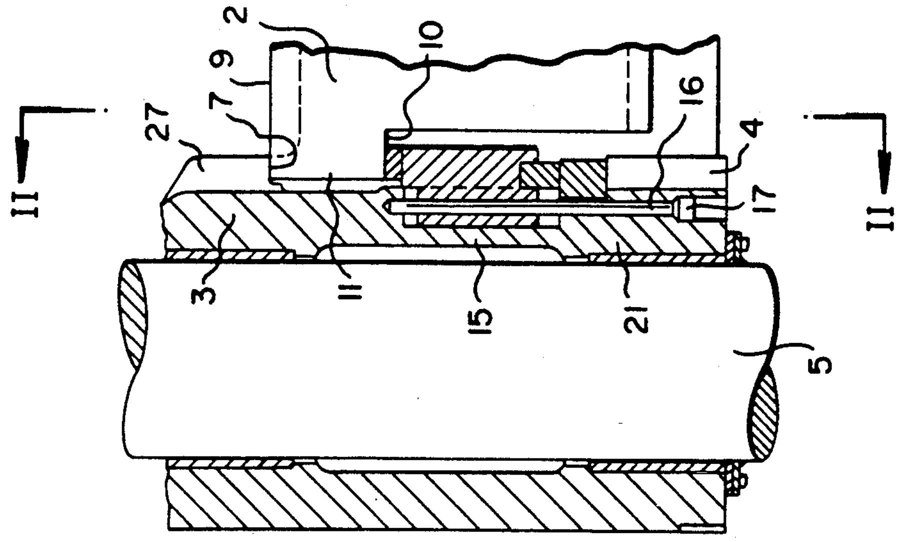
FIG. 5 is a partial cross-sectional view through a mold table of the present invention taken along the line I—I in FIG. 6 but with the mold block being removed.
Figure 6:
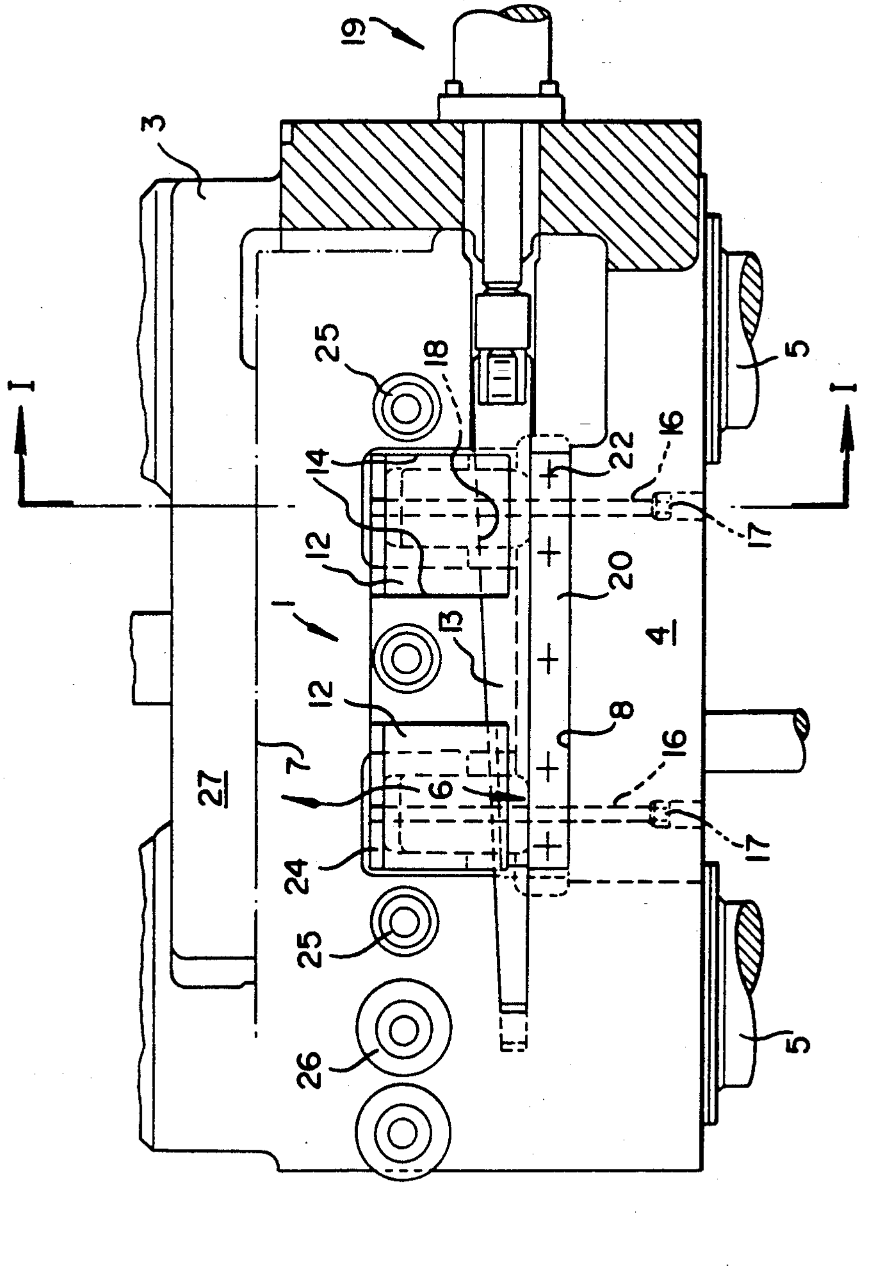
FIG. 6 is a partial longitudinal section through the mold table of the press taken along the line II—II in FIG. 5.
Figure 7:
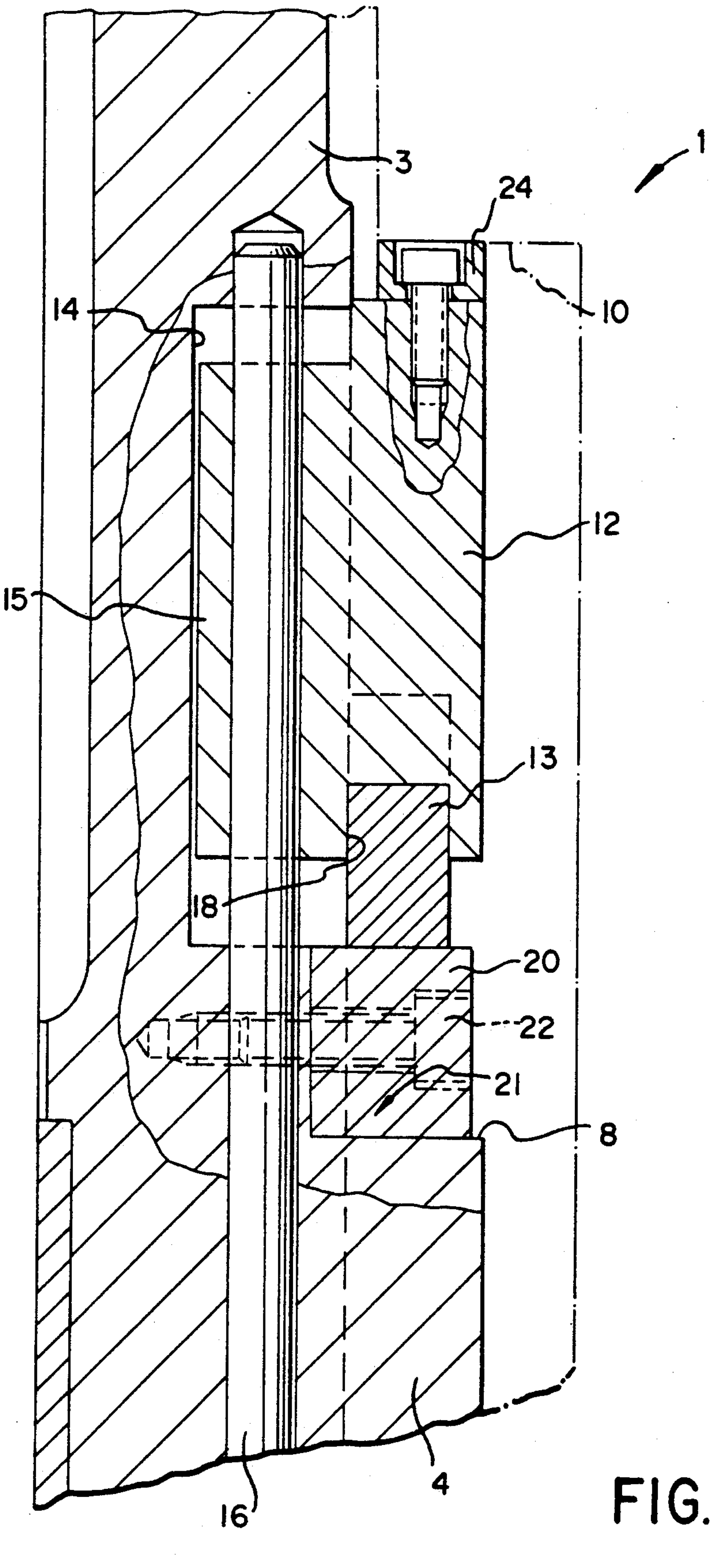
FIG. 7 is a portion of the view in FIG. 5 but in enlarged scale to illustrate the guide arrangement.

FIGS. 1 to 3 of the drawing show a device 1 for detachably fastening a (mold block) box 2 on a U-shaped mold table 3 of a mold press, for example one for the production of ceramic molded blocks. The opening of U-shaped mold table 3 is located on the operating or front side of the press. Legs 4 of mold table 3 extend from rear columns 5 to front columns 5' shown in FIGS. 2 and 3 of the press. The inner side of legs 4 is provided with a guide groove 6 to anchor box 2, and these guide grooves 6 run along extensions of legs 4 and are recognizable in the figures by their lateral adjusting surfaces 7, 8. Between adjusting surfaces 7 and 8, box 2 is clamped by key 13 on one shoulder 11 formed by surface 9 of box 2 and a support surface 10 to lie on mold carriers 12 in the operating position. Mold carriers 12 used for this purpose exhibit on their back side an offset cam 15 that can be moved in a vertical guide track 14 and that is held in guide track 14 by a stoppable guide bar 16 inserted into mold table 3 from below and passing through cam 15 of mold carrier 12. Guide bar 16 is secured by a thread 17 on the rear end. The two mold carriers 12 on each one side of the guide arrangement are provided with a groove 18 corresponding to the key pitch, a groove in which in each case a key 13 is driven in from the outside by a hydraulic drive element 19.

To protect the key bearing surface, which is formed by an adjusting surface 8 of guide grooves 6, a strip 20 is provided in a prismatic recess 21 on mold table 3 and is fastened by screws 22.

Mold carriers 12 receiving shoulders 11 of box 2 exhibit, on their top side, a protective plate 24.

Before box 2 is anchored, it is shifted into the rear position, when key 13 is retracted, by transport rollers 25 and guide rollers 26, which are mounted to pivot freely in legs 4 of mold table 3, and is lifted into the operating position by keys 13 that are then driven in. Here box 2 crops out with its lateral edge on adjusting surfaces 7 of guide grooves 6, which are formed by ribs 27 projecting beadlike on legs 4.

When box 2 is replaced, first keys 13 are loosened so that box 2 comes to lie on guide rollers 26 and transport rollers 25.

We claim:

1. In a press having a mold table and a removable mold block insertable therein, the improvement comprising a device for inserting and detachably fastening the insertable mold block in an operating position on the mold table, said mold table and the insertable block having thereon laterally opposite guide members, lifting means on said mold table between said guide members for holding the mold block against downward-oriented adjusting surfaces of said guide members on said mold table in the operating position, said block having a surface with a mold feed opening therein, said block surface and said adjusting surfaces provided on the mold table defining a common plane when said mold block is in the operating position.

2. In a press according to claim 1, wherein the press comprises a block press for the production of molded parts made of a free-flowing material and further comprising a mold-filling slide bar on said block press for feeding said free-flowing material to a mold cavity provided in said mold block, said filling slide bar having a contact surface adjacent to said block and said contact surface being flush with the common plane defined by the mold table and said block.

3. In a press according to claim 1, wherein support surfaces on said mold block form a shoulder with said surface of the block.

4. In a press according to claim 1 wherein said mold carrier has a contact surface facing a shoulder of said mold block and a plate defining said contact surface.

5. In a press according to claim 1 and further comprising inward-projecting ribs running along said legs of said block to define adjusting surfaces of said guide grooves.

6. In a press according to claim 1 wherein said mold table is U-shaped in horizontal cross-section and has a pair of legs having inner sides, there being opposite guide grooves defined on said inner sides by said opposite guide members, at least one mold carrier in said guide grooves for supporting support surfaces on said mold block, and a key movable into a said guide groove and engaging said mold carriers to anchor said mold block in the operating position.

7. In a press according to claim 6 wherein a said guide groove is defined by a downwardly-oriented surface on said molding table and a further upwardly-oriented surface on said molding table, said upwardly-oriented supporting surface defining a keyway for said key and having thereon a strip.

8. In a press having a mold table and a removable mold block insertable therein, the improvement comprising a device for inserting and detachably fastening the insertable mold block in an operating position on the mold table, said mold table and the insertable block having thereon laterally opposite guide members, lifting means on said mold table for holding the mold block against downward-oriented adjusting surfaces of said guide members on said mold table in the operating position, said block having a surface with a mold feed opening therein, said block surface and the adjusting surfaces provided on the mold table define a common plane when said mold block is in the operating position, said mold table is U-shaped in horizontal cross-section and has a pair of legs having inner sides, there being opposite guide grooves defined on said inner sides by said opposite guide members, at least one mold carrier in said guide grooves for supporting support surfaces on said mold block.

* * * * *